United States Patent
Furuta

(10) Patent No.: US 12,350,987 B2
(45) Date of Patent: Jul. 8, 2025

(54) SUSPENSION DEVICE

(71) Applicant: TOYOTA JIDOSHA KABUSHIKI KAISHA, Toyota (JP)

(72) Inventor: Hiroki Furuta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/772,645

(22) Filed: Jul. 15, 2024

(65) Prior Publication Data

US 2025/0074128 A1 Mar. 6, 2025

(30) Foreign Application Priority Data

Aug. 28, 2023 (JP) ................................. 2023-137785

(51) Int. Cl.
*B60G 17/015* (2006.01)

(52) U.S. Cl.
CPC ...... *B60G 17/0157* (2013.01); *B60G 2200/21* (2013.01); *B60G 2204/422* (2013.01)

(58) Field of Classification Search
CPC .......... B60G 21/0555; B60G 2204/422; B60G 2200/21; B60G 17/0157
See application file for complete search history.

(56) References Cited

U.S. PATENT DOCUMENTS

| | | | | |
|---|---|---|---|---|
| 5,106,120 A * | 4/1992 | Di Maria | ........... | B60G 21/0555 137/625.23 |
| 6,832,772 B2 * | 12/2004 | Conover | ............. | B60G 17/025 280/124.106 |
| 7,543,823 B2 * | 6/2009 | Buma | ..................... | B60L 15/20 280/5.502 |
| 9,919,574 B2 * | 3/2018 | Füssl | .................. | B60G 21/0556 |
| 11,511,593 B2 * | 11/2022 | Lekon | ................ | B60G 17/0157 |
| 11,518,208 B2 * | 12/2022 | Lekon | ..................... | H02P 21/20 |
| 11,577,576 B2 * | 2/2023 | Beller | ............... | B60G 21/0555 |
| 2003/0080526 A1 * | 5/2003 | Conover | ............ | B60G 21/0553 280/124.106 |
| 2005/0023789 A1 * | 2/2005 | Suzuki | ............... | B60G 21/0555 280/124.106 |
| 2006/0138732 A1 * | 6/2006 | Buma | ................ | B60G 17/0162 280/5.5 |

(Continued)

FOREIGN PATENT DOCUMENTS

JP 2008-308098 A 12/2008

OTHER PUBLICATIONS

JP 2008308098 A machine translation from FIT (Year: 2024).*

*Primary Examiner* — Paul N Dickson
*Assistant Examiner* — Maxwell L Meshaka
(74) *Attorney, Agent, or Firm* — Sughrue Mion, PLLC

(57) ABSTRACT

A suspension device installed in a vehicle includes a motor, a torsion bar, a linking member, and a support member. A first portion of the torsion bar is linked to an output shaft of the motor. The linking member is configured to link between a second portion of the torsion bar and an unsprung member. The support member is configured to support the motor on a sprung structure via a first elastic member, and is disposed such that the motor and the torsion bar integrally turn in a direction orthogonal to a first direction, about a position of the support member as a center of turning. The first direction is an axial direction of the torsion bar.

12 Claims, 11 Drawing Sheets

(56) References Cited

U.S. PATENT DOCUMENTS

| | | | |
|---|---|---|---|
| 2006/0212199 A1* | 9/2006 | Urababa | B60G 21/0555 |
| | | | 701/38 |
| 2008/0221757 A1* | 9/2008 | Ketteler | B60G 17/019 |
| | | | 701/37 |
| 2017/0008366 A1* | 1/2017 | Füssl | B60G 21/0556 |
| 2021/0061048 A1* | 3/2021 | Beller | B60G 21/0555 |
| 2021/0061050 A1* | 3/2021 | Lekon | B60G 17/0157 |
| 2021/0061051 A1* | 3/2021 | Lekon | H02P 21/22 |

* cited by examiner

SUSPENSION DEVICE

CROSS-REFERENCE TO RELATED APPLICATION

This application claims priority to Japanese Patent Application No. 2023-137785 filed on Aug. 28, 2023, incorporated herein by reference in its entirety.

BACKGROUND

1. Technical Field

The present disclosure relates to a suspension device that is installed in a vehicle.

2. Description of Related Art

Japanese Unexamined Patent Application Publication No. 2008-308098 (JP 2008-308098 A) discloses an active suspension device for a vehicle. The active suspension device is configured to be capable of active up-down motion of wheels by using an actuator. More specifically, one end of a torsion portion is linked to an output turning shaft of the actuator. The other end of the torsion portion is linked to a suspension arm via a link. When the torsion portion is twisted by the actuator, twisting moment thereof is converted into force in an up-down direction via the link, and applied to the suspension arm. In JP 2008-308098 A, the actuator is supported by rubber bushings at two locations spaced apart in an axial direction of the torsion portion.

SUMMARY

In an active suspension device that uses torsion bars, a wheel rate increases proportionate to the stiffness of the torsion bars. Increase in the wheel rate is undesirable for controlling high frequency vibrations, for example. Making the torsion bar itself softer, in order to suppress the increase in wheel rate, is conceivable. However, making the torsion bar thinner makes the torsion bar to become more likely to break due to insufficient strength. When the length of the torsion bar is increased, this causes problems such as increased weight and increased size. Lowering twisting stiffness of the torsion bar itself also creates the problem of insufficient strength. Thus, reducing the wheel rate is important, but not easy.

The present disclosure provides a suspension device that can effectively reduce wheel rate in an active suspension device that uses torsion bars.

A suspension device according to a first aspect of the present disclosure is installed in a vehicle. The suspension device includes a motor, a torsion bar, a linking member, and a support member. A first portion of the torsion bar is linked to an output shaft of the motor. The linking member is configured to link between a second portion of the torsion bar and an unsprung member. The support member is configured to support the motor on a sprung structure via a first elastic member, and is disposed such that the motor and the torsion bar integrally turn in a direction orthogonal to a first direction, about a position of the support member as a center of turning. The first direction is an axial direction of the torsion bar.

In the suspension device according to the first aspect of the present disclosure, the support member may include a first support member and a second support member that are spaced apart in a second direction orthogonal to the first direction.

In the suspension device according to the first aspect of the present disclosure, the second portion of the torsion bar may be located on a first side as viewed from the motor. The support member may be closer to an end portion of a second side of the motor than to an end portion of the first side of the motor. The second side of the motor may be on a side that is opposite to the first side.

In the suspension device according to the first aspect of the present disclosure, the support member may be positioned at the end portion of the second side of the motor.

In the suspension device according to the first aspect of the present disclosure, the support member may include an outer cylinder fixed to one of the motor and the sprung structure, an inner cylinder fixed to another of the motor and the sprung structure, and the first elastic member that is interposed between the outer cylinder and the inner cylinder.

In the suspension device according to the first aspect of the present disclosure, an axial direction of the outer cylinder and the inner cylinder may be a direction intersecting the first direction.

In the suspension device according to the first aspect of the present disclosure, the torsion bar may not be supported on the sprung structure between the first portion and the second portion.

The suspension device according to the first aspect of the present disclosure may further include a bar support member that is configured to support the torsion bar on the sprung structure via a second elastic member.

A suspension device according to a second aspect of the present disclosure is installed in a vehicle. The suspension device includes a motor, a torsion bar, a linking member, and a support member. A first portion of the torsion bar is linked to an output shaft of the motor. The linking member is configured to link between a second portion of the torsion bar and an unsprung member. The support member is configured to support the motor on a sprung structure via a first elastic member, and is positioned at one location in a first direction. The first direction is an axial direction of the torsion bar.

In the suspension device according to the second aspect of the present disclosure, the support member may include a first support member and a second support member that are spaced apart in a second direction orthogonal to the first direction.

In the suspension device according to the second aspect of the present disclosure, the second portion of the torsion bar may be located on a first side as viewed from the motor. The support member may be closer to an end portion of a second side of the motor than to an end portion of the first side of the motor. The second side of the motor may be on a side that is opposite to the first side.

In the suspension device according to the second aspect of the present disclosure, the support member may be positioned at the end portion of the second side of the motor.

In the suspension device according to the second aspect of the present disclosure, the support member may include an outer cylinder fixed to one of the motor and the sprung structure, an inner cylinder fixed to another of the motor and the sprung structure, and the first elastic member that is interposed between the outer cylinder and the inner cylinder.

In the suspension device according to the second aspect of the present disclosure, an axial direction of the outer cylinder and the inner cylinder may be a direction intersecting the first direction.

In the suspension device according to the second aspect of the present disclosure, the torsion bar may not be supported on the sprung structure between the first portion and the second portion.

The suspension device according to the second aspect of the present disclosure may further include a bar support member that is configured to support the torsion bar on the sprung structure via a second elastic member.

According to the present disclosure, the suspension device that uses the motor and the torsion bar is provided. The support member supports the motor on the sprung structure via the elastic member. Also, the support member is disposed such that the motor and the torsion bar can turn integrally in an axis-perpendicular direction, with the position of the support member as a fulcrum. When external force is input, the motor and the torsion bar integrally turn in the axis-perpendicular direction, with the position of the support member as a fulcrum. This reduces amount of twisting of the torsion bar due to external force. That is to say, the wheel rate is effectively reduced. Effectively reducing the wheel rate enables a control effect with respect to high-frequency vibrations to be improved.

It should be noted here there is no need to soften the torsion bar itself in order to reduce the wheel rate. Since there is no need to make the torsion bar itself thinner, strength of the torsion bar is ensured and breakage thereof is suppressed. Also, there is no need to lengthen the torsion bar itself, and accordingly there is no increase in weight, and the installation space is not cramped. Thus, according to the present disclosure, the wheel rate can be effectively reduced, and the control effect on high-frequency vibrations can be improved, without causing problems such as insufficient strength or increased weight of the torsion bar.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will be described with reference to the attached drawings.

First Embodiment 1-1. Overview of Suspension Device

Figure 1:
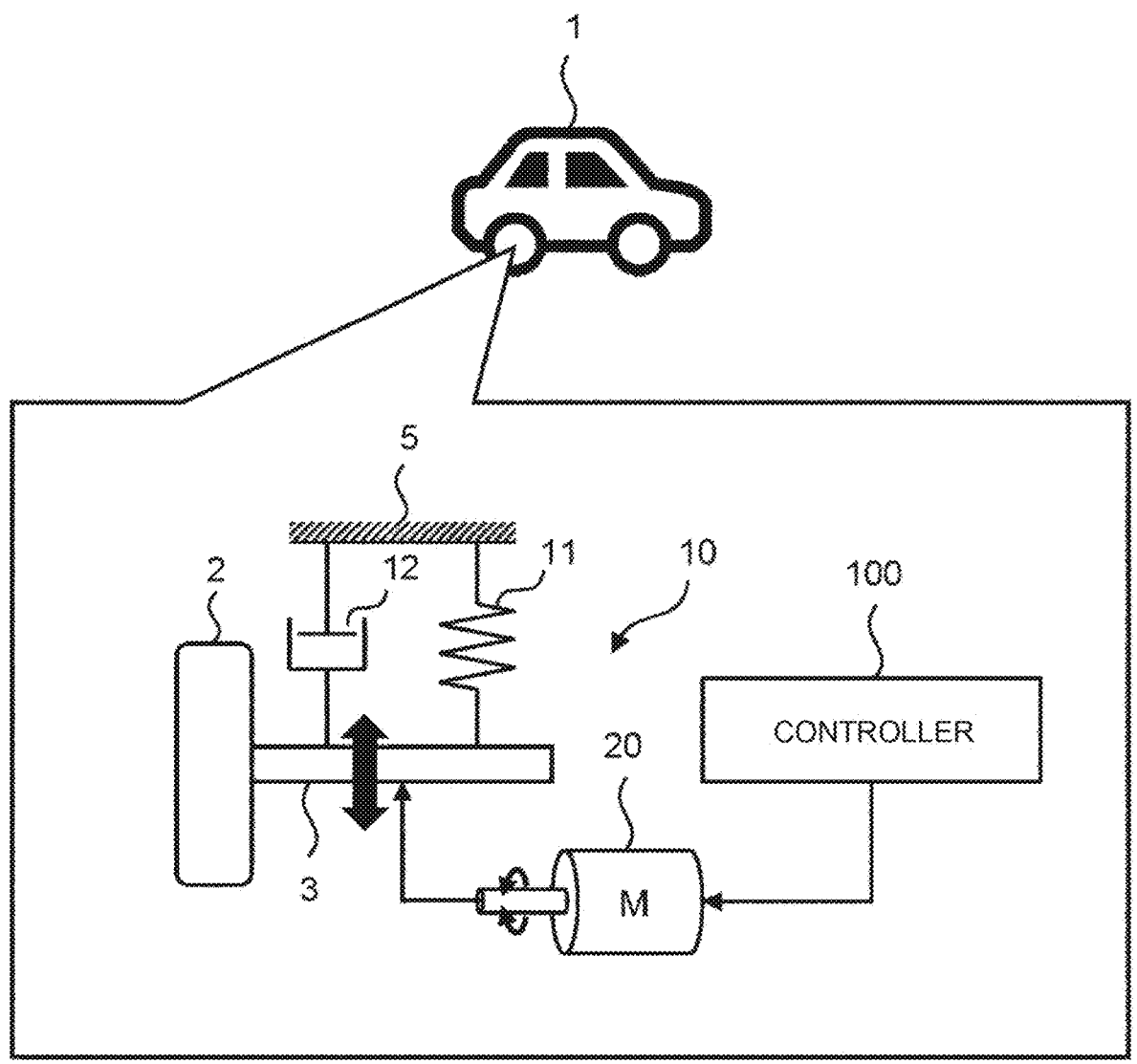
FIG. 1 is a schematic diagram for describing a suspension device installed in a vehicle according to an embodiment.

FIG. 1 is a schematic diagram for describing a suspension device 10 that is installed in a vehicle 1. The suspension device 10 suspends a wheel 2 of the vehicle 1. The suspension device 10 includes a spring 11 and a shock absorber 12. The spring 11 and the shock absorber 12 are provided between an unsprung member 3 and a sprung structure 5.

The suspension device 10 is a so-called full-active suspension device, and is configured to be able to actively apply force in an up-down direction to the unsprung member 3. For this purpose, the suspension device 10 further includes a motor (actuator) 20. The motor 20 is supported on the sprung structure 5. Also, actions of the motor 20 are controlled by a controller 100. Moment generated by actions of the motor 20 is converted into a force in the up-down direction and is applied to the unsprung member 3 (e.g., suspension arm).

Figure 2:
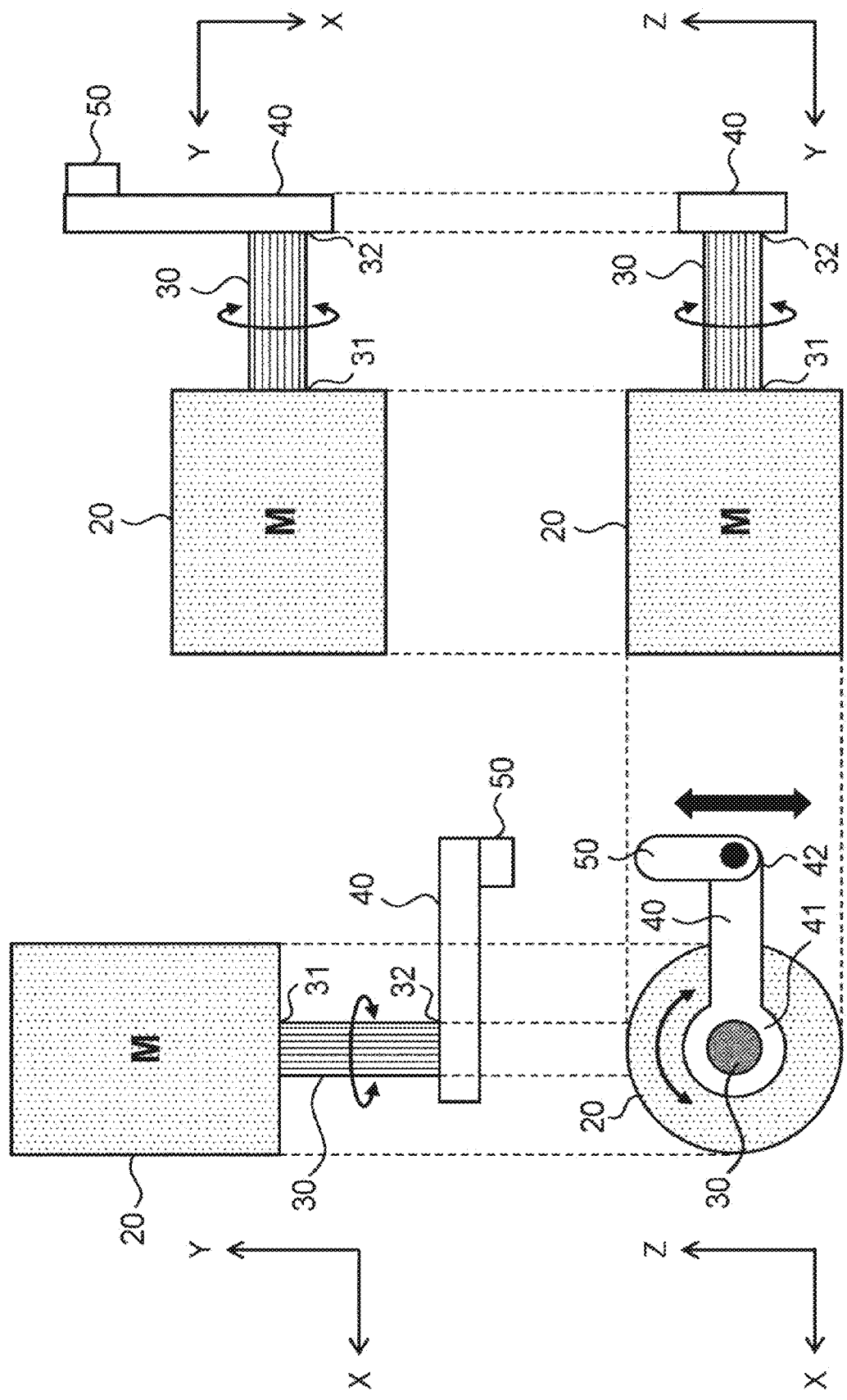
FIG. 2 is a schematic diagram for describing a mechanism of the suspension device according to the embodiment.

FIG. 2 is a schematic diagram for describing a mechanism of the suspension device 10. According to the present embodiment, a "torsion bar 30" is used to convey the moment generated by the actions of the motor 20 to the unsprung member 3. In the following description, an axial direction of the torsion bar 30 will be referred to as "Y direction" (first direction), for sake of convenience. An X direction (second direction) and a Z direction (third direction) are axis-perpendicular directions that are orthogonal to the Y direction. The X direction and the Z direction are also orthogonal to each other. Note that the notation of X, Y, and Z is for sake of convenience, and the Z direction does not necessarily mean a vertical direction. The Z direction may be the vertical direction, in which case an XY plane is a horizontal plane.

As illustrated in FIG. 2, the torsion bar 30 extends in the Y direction. More specifically, the torsion bar 30 has a first portion 31 and a second portion 32 that are spaced apart in the Y direction. For example, the first portion 31 is one end of the torsion bar 30, and the second portion 32 is the other end of the torsion bar 30. The first portion 31 of the torsion bar 30 is linked to an output shaft of the motor 20. The first portion 31 may be fixed to the output shaft of the motor 20. The second portion 32 of the torsion bar 30 is linked to a lever 40. The second portion 32 may be fixed to the lever 40.

The lever 40 extends in a direction orthogonal to the Y direction. More specifically, the lever 40 has a first portion 41 and a second portion 42 that are spaced apart in a direction orthogonal to the Y direction. The first portion 41 of the lever 40 is linked to the second portion 32 of the torsion bar 30. The first portion 41 may be fixed to the second portion 32 of the torsion bar 30. The second portion 42 of the lever 40 is linked to the unsprung member 3 (e.g., suspension arm) via a link 50. The lever 40 and the link 50 can be said to make up a linking member that links the second portion 32 of the torsion bar 30 and the unsprung member 3.

The torsion bar 30 and the lever 40 may be integrally formed. The lever 40 and the link 50 can be said to make up a linking member that links the second portion 32 of the torsion bar 30 and the unsprung member 3, in this case as well.

As illustrated in FIG. 2, turning of the motor 20 causes the torsion bar 30 to be twisted. Twisting moment of the torsion bar 30 causes the lever 40 to turn about the first portion 41 (the torsion bar 30) as the center of turning in an XZ plane orthogonal to the Y direction. As a result, the second portion 42 of the lever 40 moves in a direction orthogonal to the Y direction. In the example illustrated in FIG. 2, the second portion 42 of the lever 40 is spaced apart as viewed from the first portion 41 in substantially the X direction. When the lever 40 turns about the first portion 41 (torsion bar 30) as the center of turning, the second portion 42 moves in substantially the Z direction. Such motion of the second portion 42 of the lever 40 is converted into motion of the unsprung member 3 in the up-down direction, via the link 50.

Thus, the twisting moment of the torsion bar 30 twisted by the motor 20 is converted into force in the up-down direction and is applied to the unsprung member 3. It can also be said that the lever 40 and the link 50 make up a conveying member that converts the twisting moment of the torsion bar 30 into the up-down direction force and performs conveying thereof to the unsprung member 3.

Conversely, when the unsprung member 3 exhibits up-down motion due to an external force (road surface input, etc.), the up-down motion is converted into motion of the second portion 42 of the lever 40 via the link 50. When the second portion 42 of the lever 40 moves in a direction orthogonal to the Y direction, the torsion bar 30 will also be twisted accordingly. The lever 40 and the link 50 can also be said to make up a conveying member that conveys the up-down motion of the unsprung member 3 to the torsion bar 30.

Figure 3:
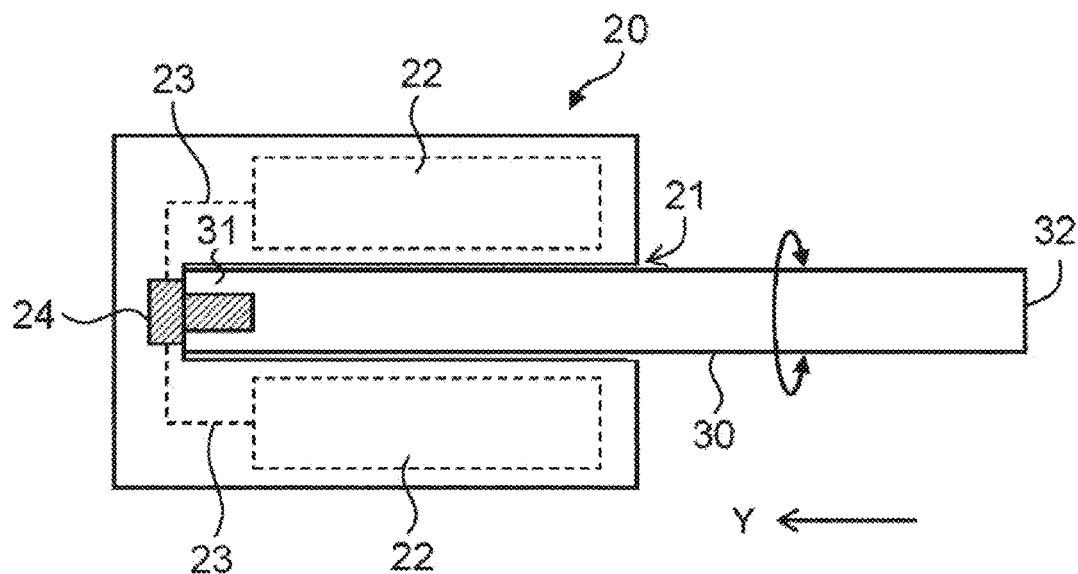
FIG. 3 is a schematic diagram illustrating a configuration example of a motor and a torsion bar according to the embodiment.

FIG. 3 is a schematic diagram illustrating a configuration example of the motor 20 and the torsion bar 30. In the example illustrated in FIG. 3, the motor 20 has an insertion hole 21. Part of the torsion bar 30 is inserted into this insertion hole 21. The motor 20 further has a motor unit 22, a gear unit 23, and a linking unit 24. The motor unit 22 is disposed around the insertion hole 21. The motor unit 22 is connected to the linking unit 24 via the gear unit 23. The linking unit 24 is linked to the first portion 31 of the torsion bar 30. The linking unit 24 may be fastened to the first portion 31 of the torsion bar 30. The linking unit 24 is an example of an output shaft of the motor 20. Turning force generated in the motor unit 22 is conveyed to the linking unit 24 via the gear unit 23, and the linking unit 24 turns. Turning of the linking unit 24 causes the torsion bar 30 to be twisted.

Note that configurations of the motor 20 and the torsion bar 30 are not limited to the example illustrated in FIG. 3.

1-2. Issues

In the suspension device 10 that uses the torsion bar 30, wheel rate increases proportionate to stiffness of the torsion bar 30. This is because, as described above, up-down motion of the unsprung member 3 due to external force (road surface input and so forth), causes the torsion bar 30 to be twisted via the conveying member, and reactive force of the torsion bar 30 is generated.

Increase in the wheel rate is undesirable for controlling high frequency vibrations, for example. In a frequency band that is easy to control, effects of wheel rate increase can be mitigated through performing control that suppresses twisting of the torsion bar 30 under external force (e.g., feedback control such as skyhook damper control, preview control using a map). However, it is not necessarily easy to perform such control with respect to input in high frequency bands. As a result, high frequency vibrations may be exacerbated.

Making the torsion bar 30 itself softer, in order to suppress the increase in the wheel rate, is also conceivable. However, making the torsion bar 30 thinner makes the torsion bar 30 to become more likely to break due to insufficient strength. When the length of the torsion bar 30 is increased, this causes problems such as increased weight and increased size. Lowering the twisting stiffness of the torsion bar 30 itself also creates the problem of insufficient strength.

As described above, in the suspension device 10 using the torsion bar 30, reducing the wheel rate is important, but is not easy. The present embodiment proposes an improvisation that can effectively reduce the wheel rate from a completely new perspective. An improvisation that can effectively reduce the wheel rate will be described below in detail.

1-3. Reduction of Wheel Rate

The motor 20 is supported on the sprung structure 5 (e.g., suspension member, body). The suspension device 10 includes a "support member 60" that supports the motor 20 on the sprung structure 5. A feature of the present embodiment is in the structure and disposing of the support member 60, which enables effective reduction of the wheel rate.

First, the support member 60 includes an elastic member (dampening member) 63. The elastic member 63 is an example of a first elastic member. The elastic member 63 is made of rubber, for example. The support member 60 may be a rubber bushing. The support member 60 supports the motor 20 on the sprung structure 5 via the elastic member 63.

Figure 4:
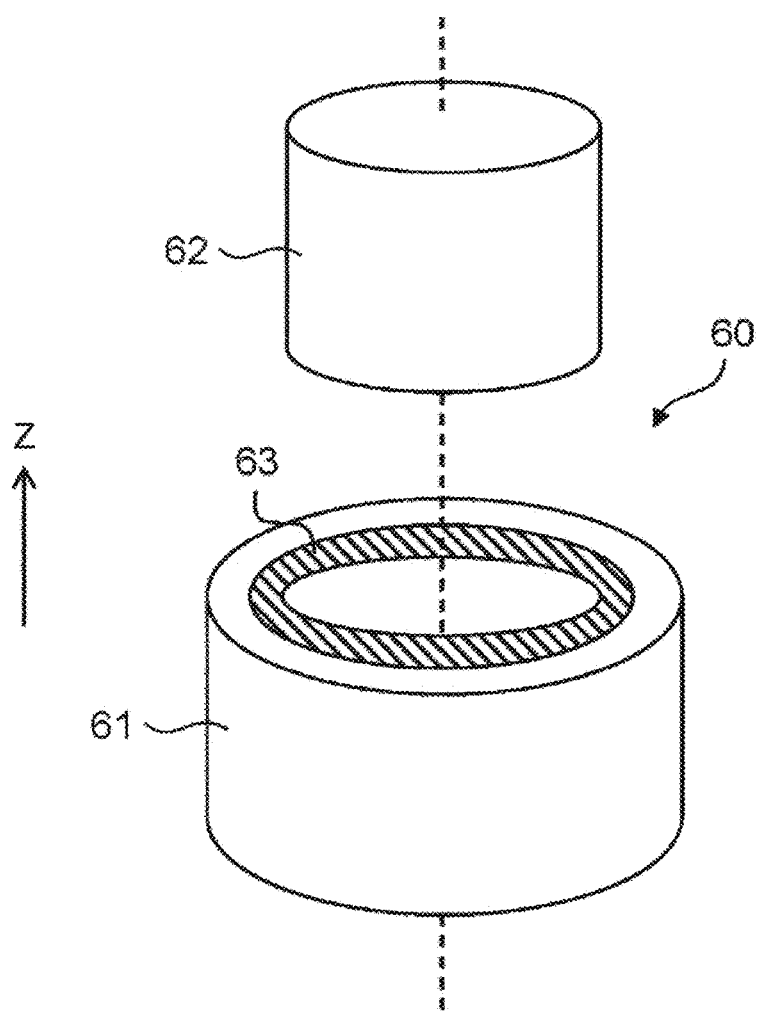
FIG. 4 is a schematic diagram illustrating a structural example of a support member according to a first embodiment.

FIG. 4 is a schematic diagram illustrating a structural example of the support member 60. The support member 60 includes an outer cylinder 61, an inner cylinder 62, and the elastic member 63. The outer cylinder 61 and the inner cylinder 62 are made of metal. The outer cylinder 61 and the inner cylinder 62 are coaxial, and the inner cylinder 62 is inserted into the outer cylinder 61. The elastic member 63 is disposed so as to be interposed between the outer cylinder 61 and the inner cylinder 62. One of the outer cylinder 61 and the inner cylinder 62 is fixed to the motor 20, and the other is fixed to the sprung structure 5. For example, the outer cylinder 61 is fixed to the motor 20, and the inner cylinder 62 is fixed to the sprung structure 5. Thus, the motor 20 is supported on the sprung structure 5 via the elastic member 63.

Figure 5:
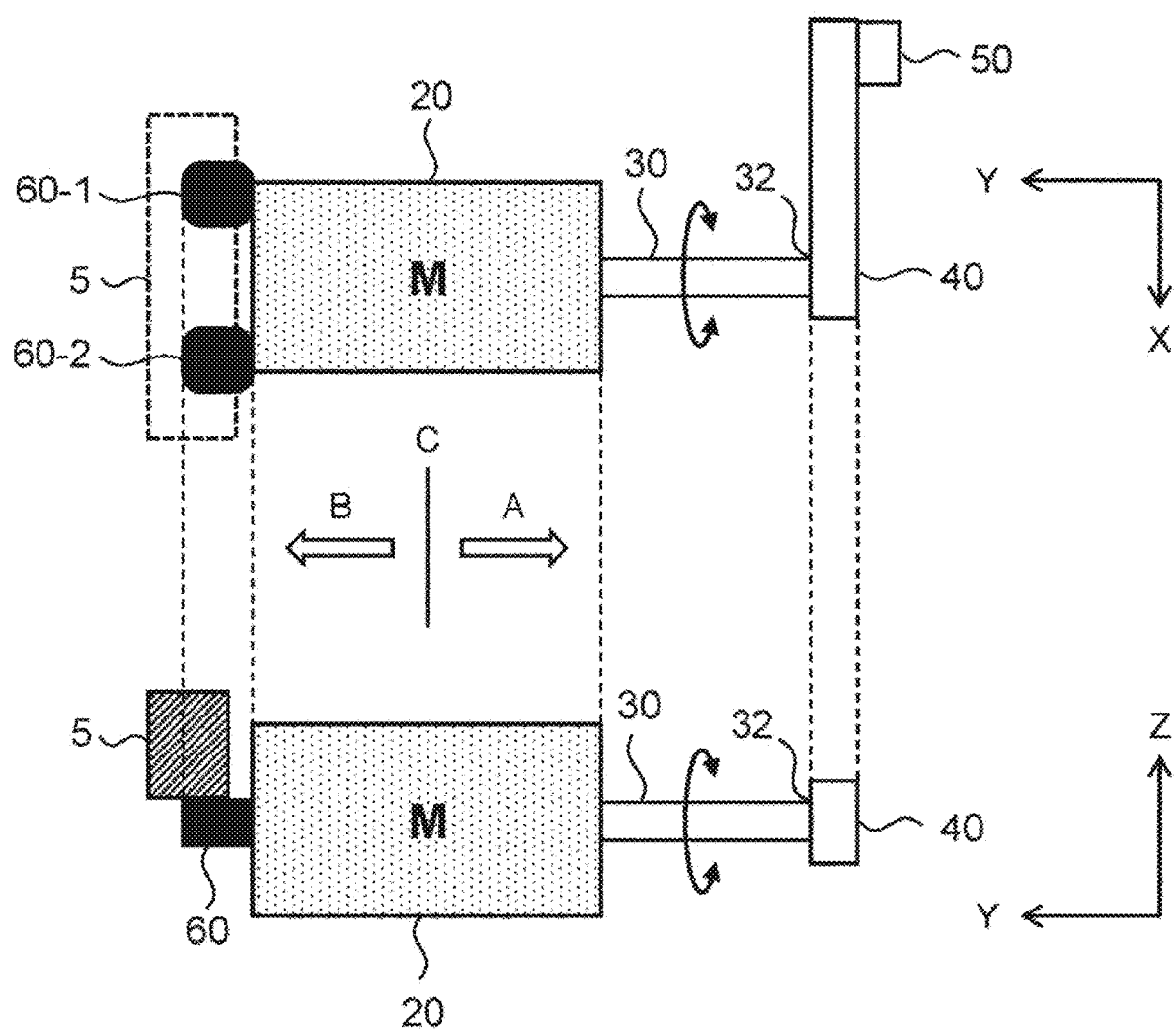
FIG. 5 is a schematic diagram illustrating an example of disposing the support member according to the first embodiment.

FIG. 5 is a schematic diagram illustrating an example of disposing the support member 60 according to the present embodiment. In the example illustrated in FIG. 5, the position of the support member 60 in the Y direction (first direction) is one location. Also, the position of the support member 60 in the Y direction is relatively far from the second portion 32 of the torsion bar 30. More specifically, the second portion 32 of the torsion bar 30 is located on an A side as viewed from the motor 20. On a side opposite to the A side is a B side. The support member 60 is not disposed on the A side as viewed from a center position C of the motor 20, but is disposed on the B side. In other words, the Y-direction position of the support member 60 is closer to a B-side end portion of the motor 20 than to an A-side end portion of the motor 20. The support member 60 may be positioned at the B-side end portion of the motor 20.

Further, in the example illustrated in FIG. 5, the support member 60 includes a first support member 60-1 and a second support member 60-2 that are spaced apart in the X direction (second direction) that is orthogonal to the Y direction. The positions of the first support member 60-1 and the second support member 60-2 in the Y direction are the same. Each of the first support member 60-1 and the second support member 60-2 supports the motor 20 on the sprung structure 5 via elastic members 63. Supporting the motor 20 at two positions in the X direction stabilizes the motor 20 so as not to turn in a circumferential direction.

Further, in the example illustrated in FIG. 5, the Z-direction position of the support member 60 is approximately the same as the Z-direction position of the torsion bar 30.

Each support member 60 in FIG. 5 may have the structure illustrated in FIG. 4. In this case, the axial direction of the outer cylinder 61 and the inner cylinder 62 may be a direction that intersects the Y direction. For example, the axial direction of the outer cylinder 61 and the inner cylinder 62 may be in the Z direction orthogonal to the Y direction.

Figure 6:
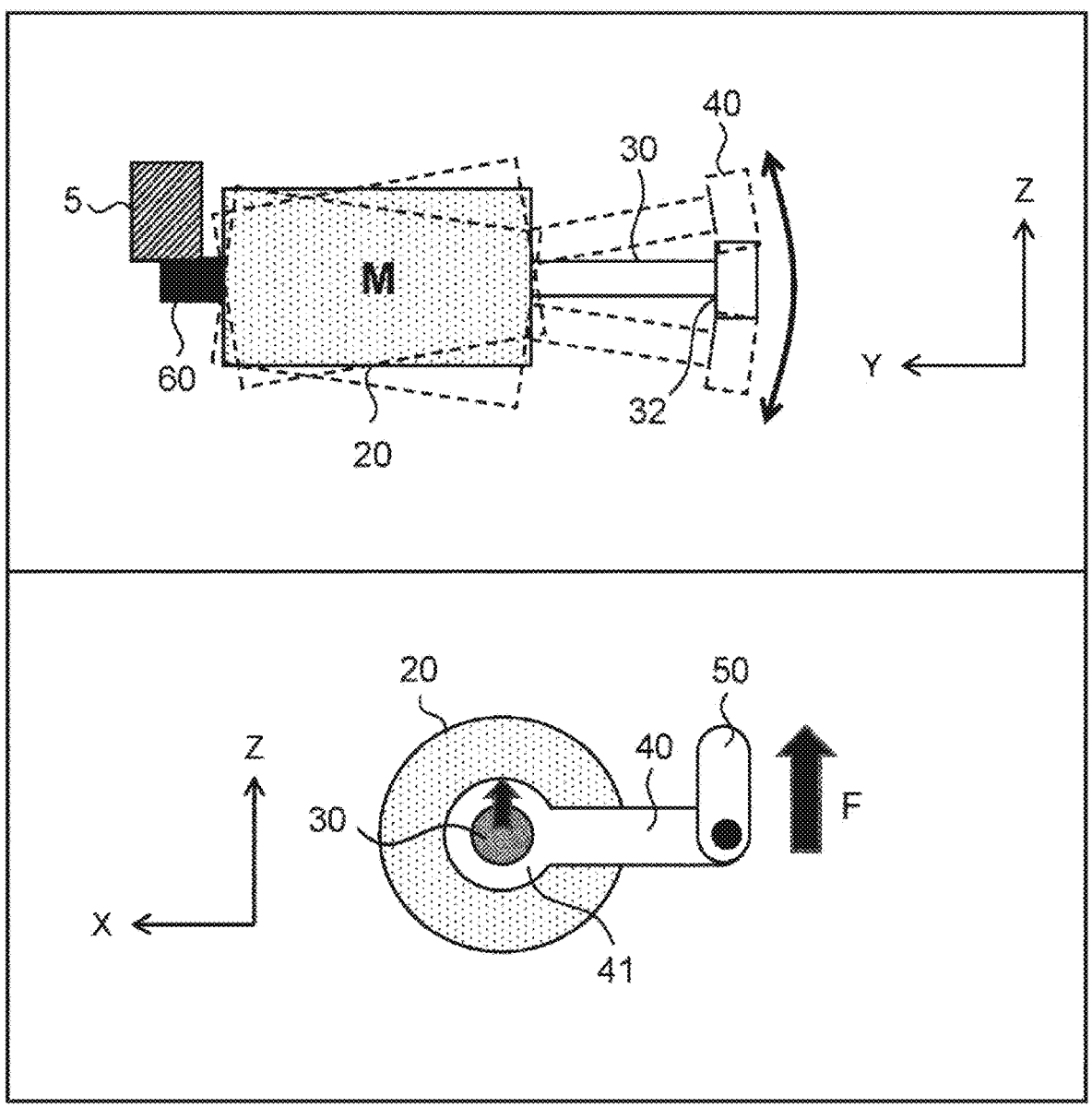
FIG. 6 is a conceptual diagram for describing effects and advantages according to the first embodiment.

FIG. 6 is a conceptual diagram for describing effects and advantages according to the present embodiment. As described above, the support member 60 is not completely formed of a rigid body, but includes the elastic member 63. The support member 60 supports the motor 20 on the sprung structure 5 via the elastic member 63. Accordingly, as illustrated in FIG. 6, the motor 20 and the torsion bar 30 turn integrally in the axis-perpendicular direction that is orthogonal to the Y direction, with the position of the support member 60 as a fulcrum (center of turning). It can also be said that the support member 60 is disposed such that the motor 20 and the torsion bar 30 can turn integrally in the axis-perpendicular direction that is orthogonal to the Y direction, with the position of the support member 60 as a fulcrum.

In the example illustrated in FIG. 5, the first support member 60-1 and the second support member 60-2 are disposed spaced apart from each other in the X direction. In this case, the motor 20 and the torsion bar 30 readily integrally turn in the Z direction that is orthogonal to the X direction and to the Y direction, with the position of the support member 60 as a fulcrum.

As described above, when the unsprung member 3 exhibits up-down motion due to external force (road surface input, etc.), the up-down motion is converted into motion of the second portion 42 of the lever 40 via the link 50. When the second portion 42 of the lever 40 moves in a direction orthogonal to the Y direction, the torsion bar 30 will also be twisted accordingly. Note however, at the same time, the motor 20 and the torsion bar 30 also integrally turn in the direction orthogonal to the Y direction, with the position of the support member 60 as a fulcrum, under force that moves the lever 40 in the direction perpendicular to the Y direction. Thus, the second portion 32 of the torsion bar 30 is displaced in a direction orthogonal to the Y direction. That is to say, the force that moves the lever 40 in the direction orthogonal to the Y direction also displaces the second portion 32 of the torsion bar 30 in the direction orthogonal to the Y direction. This substantially reduces the force that twists the torsion bar 30, and accordingly the amount of twisting of the torsion bar 30 due to external forces is reduced. This means that the wheel rate is substantially reduced.

Figure 7:
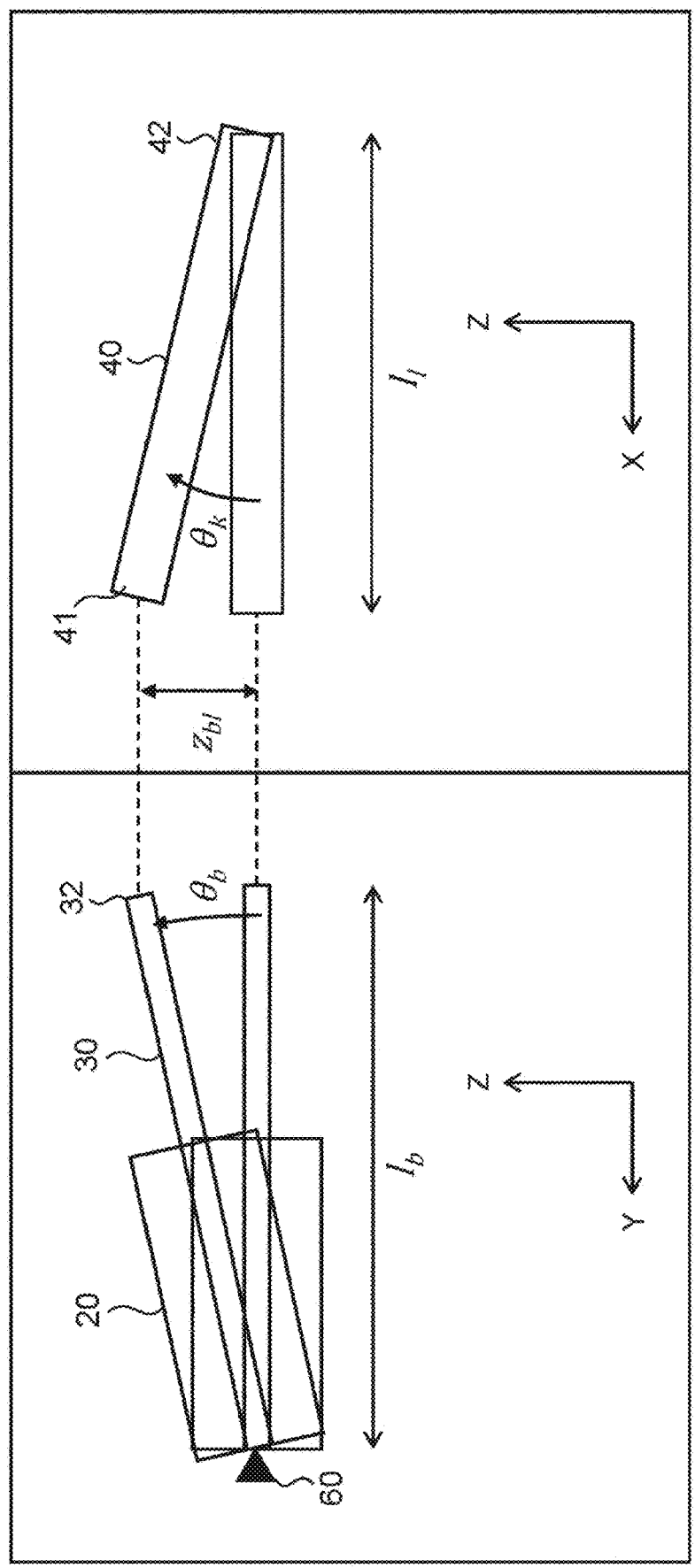
FIG. 7 is a conceptual diagram for describing effects and advantages according to the first embodiment.

A quantitative description will be given with reference to FIG. 7 $l_b$ represents the length from the position of the support member 60 to the second portion 32 of the torsion bar 30. $l_l$ represents the length of the lever 40. $z_{bl}$ represents the displacement at a linking point of the torsion bar 30 and the lever 40 (second portion 32 of torsion bar 30). Ob represents an angle of change between the motor 20 and the torsion bar 30 that is equivalent to the displacement $z_{bl}$. $\theta_k$ represents the angle of change of the lever 40 that is equivalent to the displacement $z_{bl}$. K represents the stiffness of the integral structure of the motor 20 and the torsion bar 30 in a $\theta_b$ direction. F represents external force input from the link 50. In this case, the following Expressions (1) to (4) hold true.

$$\theta_b = \frac{Fl_b}{K} \qquad (1)$$

$$z_{bl} = l_b \theta_b \qquad (2)$$

$$\theta_k = \frac{z_{bl}}{l_l} \qquad (3)$$

$$\theta_k = \frac{Fl_b^2}{Kl_l} \qquad (4)$$

A turning angle (twist angle) θ of the torsion bar 30 is reduced by $\theta_k$. When twisting stiffness of the torsion bar 30 is $K_b$, moment M generated in the torsion bar 30 is expressed by the following Expression (5).

$$M = (0 - \theta_k) K_b \qquad (5)$$

When the motor 20 and the torsion bar 30 do not turn integrally, the stiffness K in the $\theta_b$ direction is ∞ and θk is zero. On the other hand, when the motor 20 and the torsion bar 30 turn integrally, the stiffness K in the $\theta_b$ direction is a finite value, and $\theta_k$ is a non-zero value. Accordingly, when the motor 20 and the torsion bar 30 turn integrally, the moment M generated in the torsion bar 30 is reduced by $\theta_k \cdot K_b$ as compared to when there is no turning thereof. That is to say, the wheel rate is effectively reduced. Note that the stiffness K in the $\theta_b$ direction can be adjusted by adjusting the stiffness of the support member 60 including the elastic member 63. In other words, controlling the stiffness of the support member 60 including the elastic member 63 enables a targeted stiffness K in the $\theta_b$ direction to be realized.

In the example illustrated in FIGS. 5 and 6, the position of the support member 60 in the Y direction is one location. In this case in particular, the motor 20 and the torsion bar 30 readily integrally turn in a direction that is orthogonal to the Y direction, with the position of the support member 60 as a fulcrum. Thus, the wheel rate can be reduced more effectively.

Figure 8:
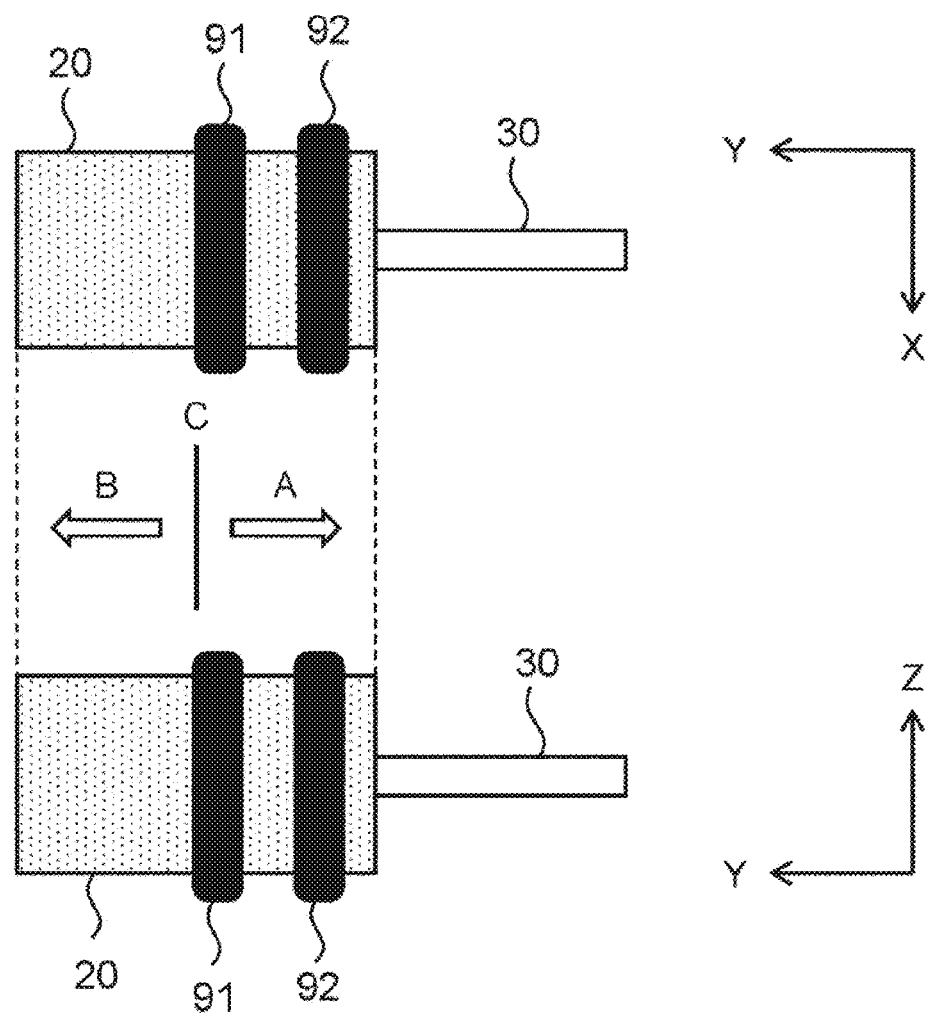
FIG. 8 is a diagram illustrating a comparative example.

FIG. 8 illustrates a comparative example (see JP 2008-308098 A). In the comparative example, two support members 91 and 92 support the motor 20 by surrounding an outer periphery thereof. Furthermore, these support members 91 and 92 are spaced apart in the Y direction. In the case of such a support form, the motor 20 and the torsion bar 30 do not readily turn in a direction orthogonal to the Y direction with the support members 91 and 92 as fulcrums. Rather, the support members 91 and 92 that are spaced apart in the Y direction act to align the axial directions of the motor 20 and the torsion bar 30 in the Y direction, and the motor 20 and the torsion bar 30 are impeded from turning in a direction orthogonal to the Y direction. Accordingly, in the comparative example illustrated in FIG. 8, the wheel rate cannot be reduced.

Also, in the example illustrated in FIGS. 5 and 6, the support member 60 is not disposed on the A side as viewed from the center position C of the motor 20, but is disposed on the B side. In other words, the Y-direction position of the support member 60 is closer to a B-side end portion of the motor 20 than to an A-side end portion of the motor 20. This means that the length $l_b$ (length from the position of the support member 60 to the second portion 32 of the torsion bar 30) illustrated in FIG. 7 is great. As can be understood from the above Expression (4), the greater the length $l_b$ is, the greater $\theta_k$ becomes, and accordingly the effect of reducing the moment M is greater. That is to say, the wheel rate can be reduced more effectively. The support member 60 may be positioned at the B-side end portion of the motor 20.

Figure 9:
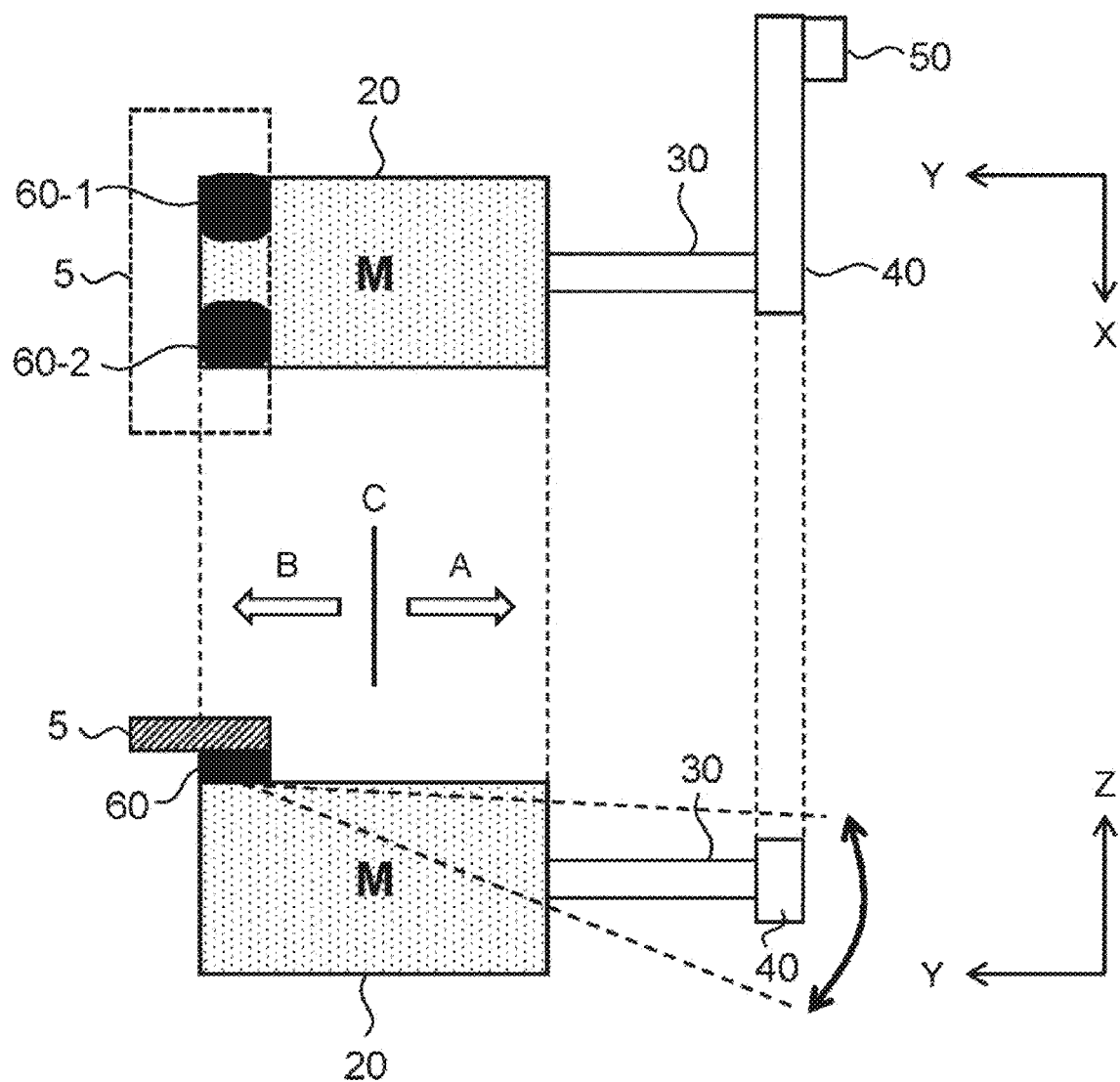
FIG. 9 is a schematic diagram illustrating another example of disposing the support member according to the first embodiment.

In the example illustrated in FIGS. 5 and 6, the Z-direction position of the support member 60 is approximately the same as the Z-direction position of the torsion bar 30. However, this is not restrictive. For example, as illustrated in FIG. 9, the support member 60 may be disposed to support an upper face or a lower face of the motor 20. Even when the support member 60 is disposed as illustrated in FIG. 9, the motor 20 and the torsion bar 30 turn integrally in the axis-perpendicular direction that is orthogonal to the Y direction, with the position of the support member 60 as a fulcrum (center of turning). It is sufficient for the support member 60 to be disposed such that the motor 20 and the torsion bar 30 can turn integrally in an axis-perpendicular direction that is orthogonal to the Y direction, with the position of the support member 60 as a fulcrum.

1-4. Advantages

As described above, according to the present embodiment, the suspension device 10 that uses the motor 20 and the torsion bar 30 is provided. The support member 60 supports the motor 20 on the sprung structure 5 via the clastic member 63. Also, the support member 60 is disposed such that the motor 20 and the torsion bar 30 can turn integrally in a direction orthogonal to the Y direction, with the position of the support member 60 as a fulcrum. When external force is input, the motor 20 and the torsion bar 30 integrally turn in a direction that is orthogonal to the Y direction, with the position of the support member 60 as a fulcrum. This reduces the amount of twisting of the torsion bar 30 due to external force. That is to say, the wheel rate is effectively reduced. Effectively reducing the wheel rate enables a control effect with respect to high-frequency vibrations to be improved.

It should be noted here there is no need to soften the torsion bar 30 itself in order to reduce the wheel rate. Since there is no need to make the torsion bar 30 itself thinner, the strength of the torsion bar 30 is ensured and breakage is suppressed. Further, there is no need to lengthen the torsion bar 30 itself, and accordingly there is no increase in weight, and the installation space is not cramped, either. According to the present embodiment, the wheel rate can be effectively reduced, and the control effect on high-frequency vibrations can be improved, without causing problems such as insufficient strength or increased weight of the torsion bar 30.

1-5. Support of Torsion Bar

In the first embodiment, there is no member that supports the torsion bar 30 between the first portion 31 and the second portion 32 of the torsion bar 30. That is to say, the torsion bar 30 is not supported on the sprung structure 5 between the first portion 31 and the second portion 32. In this case, the motor 20 and the torsion bar 30 readily turn integrally in a direction that is orthogonal to the Y direction, with the position of the support member 60 as a fulcrum.

2. Second Embodiment

When the stiffness K in the $\theta_b$ direction of the integral structure of the motor 20 and the torsion bar 30 becomes excessively small, the moment M generated in the torsion bar 30 also becomes excessively small. In that case, control force is not readily conveyed from the motor 20 to the unsprung member 3 via the torsion bar 30. Accordingly, there is a need to appropriately set the stiffness K in the $\theta_b$ direction. If the targeted stiffness K in the $\theta_b$ direction cannot be achieved only by the support member 60 on the motor 20 side, a bar support member 70 may be added on the torsion bar 30 side.

Figure 10:
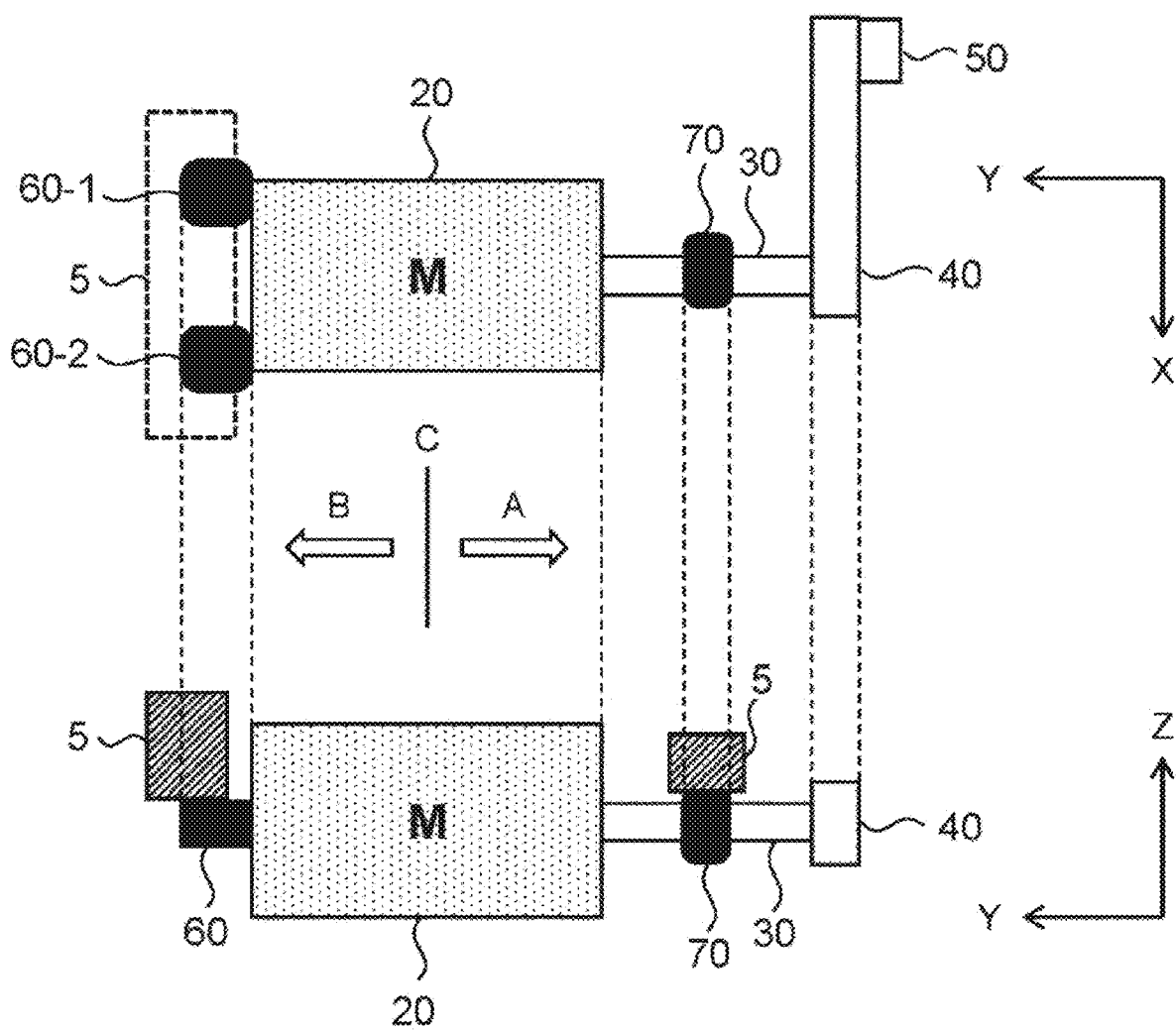
FIG. 10 is a schematic diagram illustrating an example of disposing a support member and a bar support member according to a second embodiment.

FIG. 10 is a schematic diagram illustrating an example of disposing the support member 60 and the bar support member 70 according to a second embodiment. The bar support member 70 supports the torsion bar 30 on the sprung structure 5. Similar to the support member 60, the bar support member 70 also includes an elastic member (dampening member) 72. The elastic member 72 is an example of a second elastic member. The elastic member 72 is made of rubber, for example. The bar support member 70 may be a rubber bushing. The bar support member 70 supports the torsion bar 30 on the sprung structure 5 via the elastic member 72.

Figure 11:
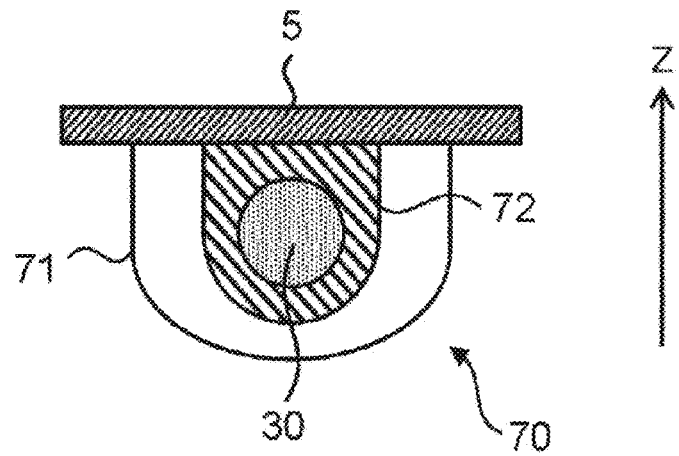
FIG. 11 is a schematic diagram illustrating a structural example of the bar support member according to the second embodiment.

FIG. 11 is a schematic diagram illustrating a structural example of the bar support member 70. The bar support member 70 includes a bracket 71 and the elastic member 72. The bracket 71 is fixed to the sprung structure 5 (e.g., suspension member, body). The bracket 71 has a through hole that passes through in the Y direction, and the elastic member 72 is disposed in the through hole. The elastic member 72 also has a through hole that extends in the Y direction, and the torsion bar 30 passes through the through hole. Thus, the torsion bar 30 is supported on the sprung structure 5 via the elastic member 72.

The stiffness K in the $\theta_b$ direction of the integral structure of the motor 20 and the torsion bar 30 is determined by a combination of the stiffness of the support member 60 on the motor 20 side and the stiffness of the bar support member 70 on the torsion bar 30 side. The second embodiment is useful when the targeted stiffness K in the $\theta_b$ direction cannot be achieved by the support member 60 on the motor 20 side alone.

3. Third Embodiment

Figure 12:
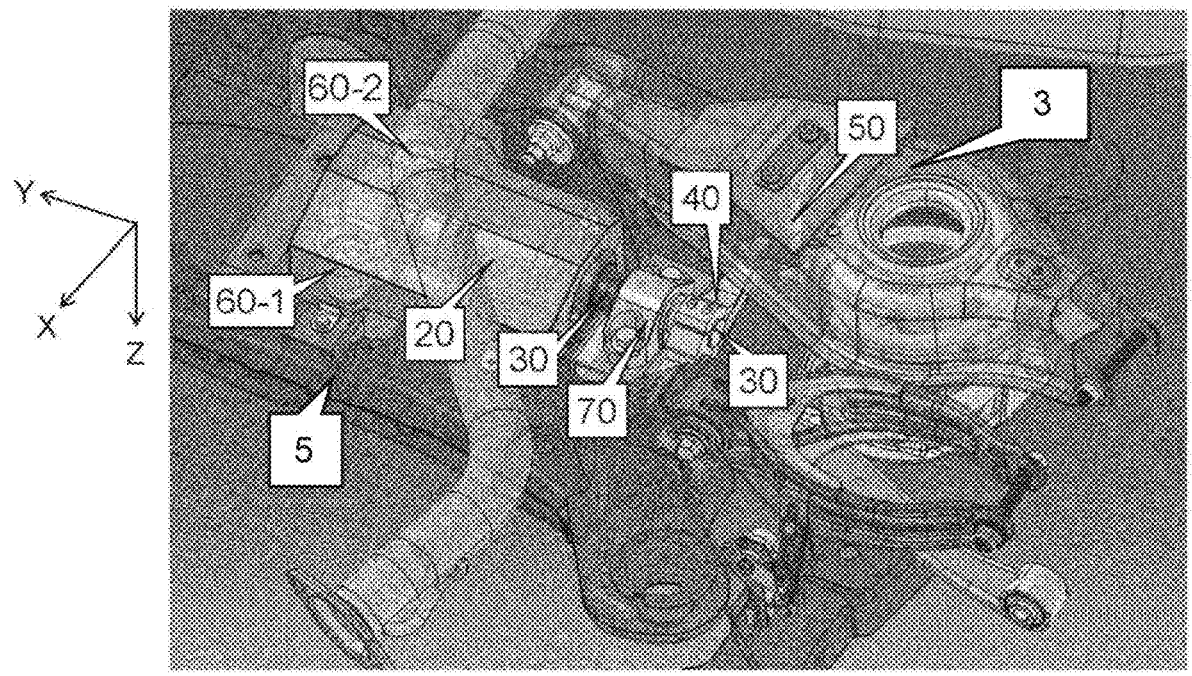
FIG. 12 is a diagram illustrating a suspension device according to a third embodiment.
Figure 13:
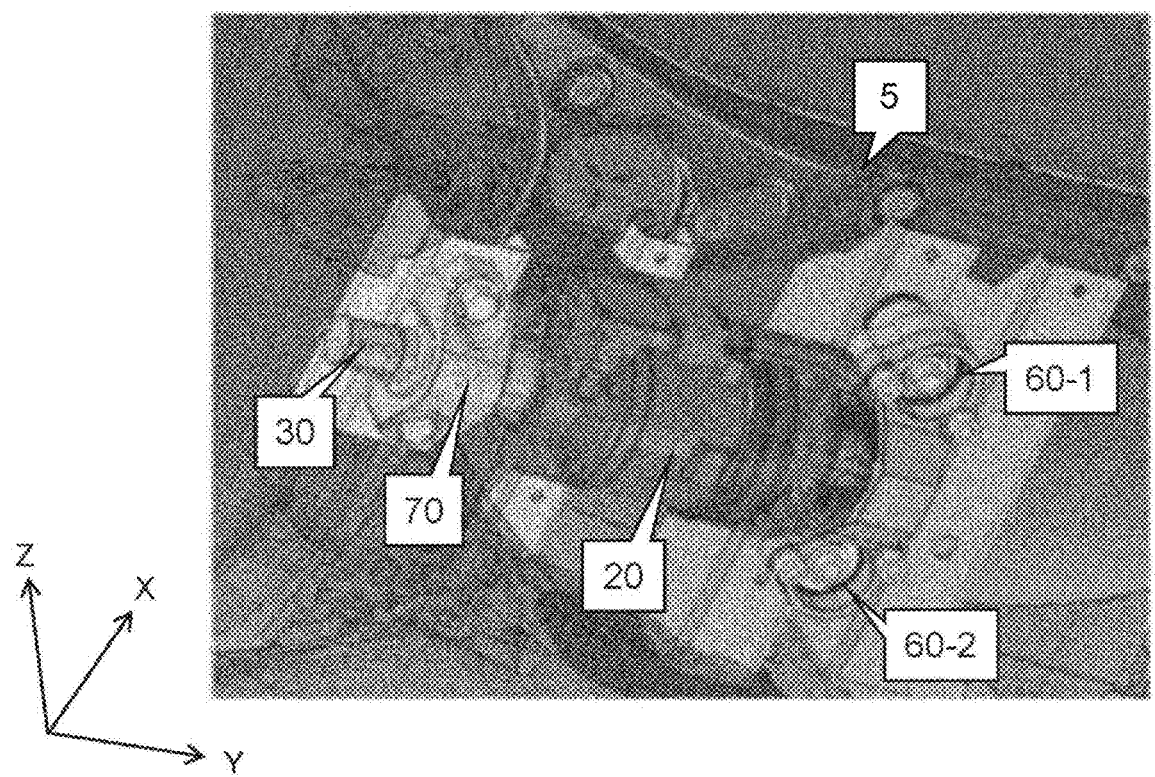
FIG. 13 is a diagram illustrating the suspension device according to the third embodiment.
Figure 14:
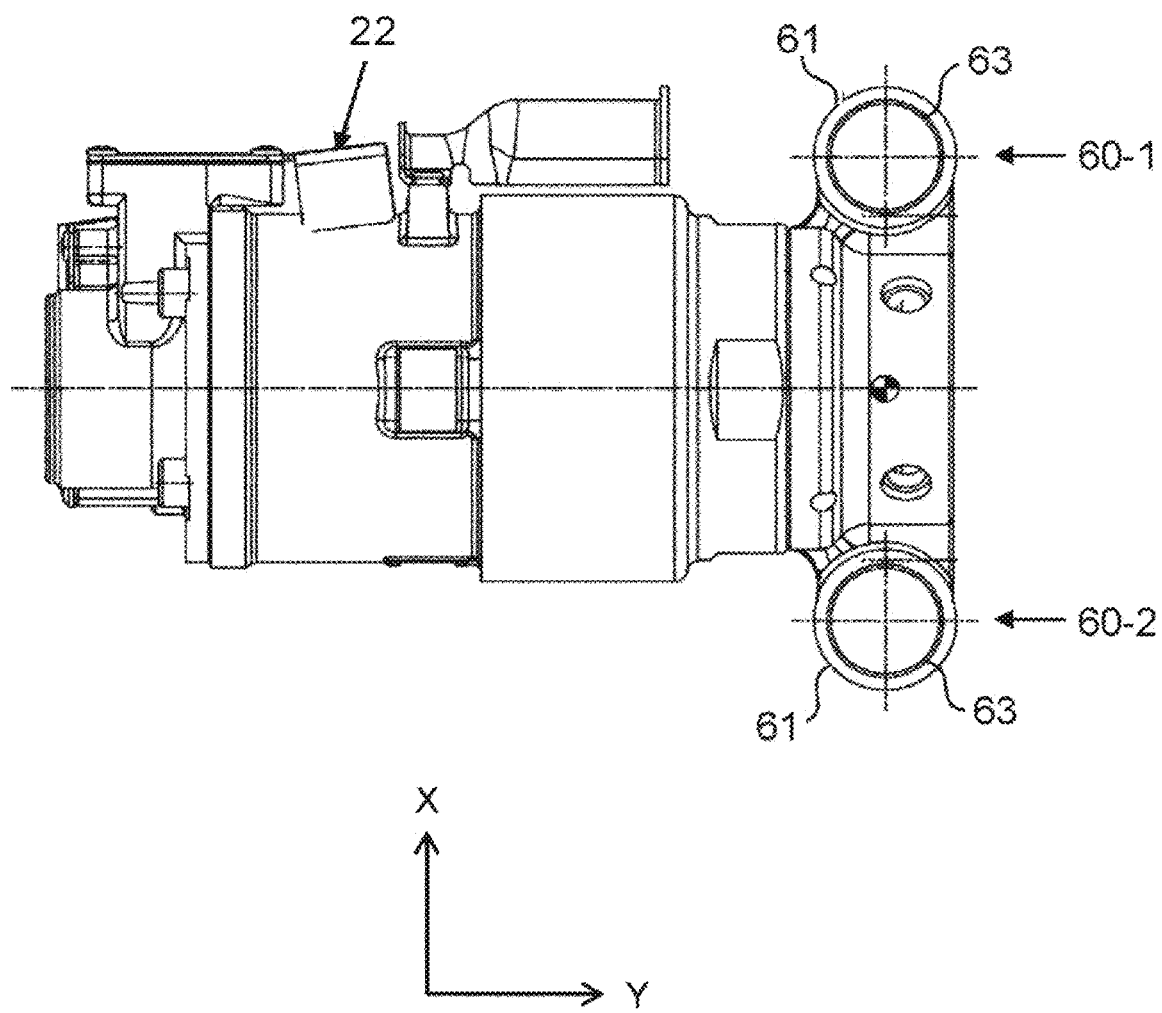
FIG. 14 is a diagram for describing a motor according to the third embodiment.

FIGS. 12 to 14 illustrate specific examples of the suspension device 10. Description that is redundant with that of the first and second embodiments will be omitted as appropriate. In the examples illustrated in FIGS. 12 to 14, the X direction is a front-rear direction, the Y direction is a lateral direction, and the Z direction is the vertical direction.

The first support member 60-1 and the second support member 60-2 are disposed at an end portion of the motor 20. The first support member 60-1 and the second support member 60-2 are spaced apart in the X direction. The positions of the first support member 60-1 and the second support member 60-2 in the Y direction are the same. Each of the first support member 60-1 and the second support member 60-2 has a structure as illustrated in FIG. 4 above. In each of the first support member 60-1 and the second support member 60-2, the axial direction of the outer cylinder 61 and the inner cylinder 62 is the Z direction. The first support member 60-1 and the second support member 60-2 are fastened to a suspension member (sprung structure 5), and support the motor 20 on the suspension member.

The bar support member 70 is also provided. The bar support member 70 supports the torsion bar 30 on the suspension member.

What is claimed is:

1. A suspension device installed in a vehicle, the suspension device comprising:
    a motor;
    a torsion bar of which a first portion is linked to an output shaft of the motor and connected to a first end of the motor in an axial direction;
    a linking member that is configured to link between a second portion of the torsion bar and an unsprung member; and
    a support member that is configured to support the motor on a sprung structure via a first elastic member, and that is disposed such that the motor and the torsion bar integrally turn in a direction orthogonal to a first direction, about a position of the support member as a center of turning, the first direction is the axial direction of the torsion bar, the support member being provided on a second axial end of the motor opposite to the first axial end.

2. The suspension device according to claim 1, wherein the support member includes a first support member and a second support member that are spaced apart in a second direction orthogonal to the first direction.

3. The suspension device according to claim 1, wherein the support member includes
    an outer cylinder fixed to one of the motor and the sprung structure,
    an inner cylinder fixed to another of the motor and the sprung structure, and
    the first elastic member that is interposed between the outer cylinder and the inner cylinder.

4. The suspension device according to claim 3, wherein an axial direction of the outer cylinder and the inner cylinder is a direction intersecting the first direction.

5. The suspension device according to claim 1, wherein the torsion bar is not supported on the sprung structure between the first portion and the second portion.

6. The suspension device according to claim 1, further comprising a bar support member that is configured to support the torsion bar on the sprung structure via a second elastic member.

7. A suspension device installed in a vehicle, the suspension device comprising:
    a motor;
    a torsion bar of which a first portion is linked to an output shaft of the motor and connected to a first end of the motor in an axial direction;
    a linking member that is configured to link between a second portion of the torsion bar and an unsprung member; and
    a support member that is configured to support the motor on a sprung structure via a first elastic member, and that is positioned at one location in a first direction, the first direction is an axial direction of the torsion bar, the support member being provided on a second axial end of the motor opposite to the first axial end.

8. The suspension device according to claim 7, wherein the support member includes a first support member and a second support member that are spaced apart in a second direction orthogonal to the first direction.

9. The suspension device according to claim 7, wherein the support member includes
    an outer cylinder fixed to one of the motor and the sprung structure,
    an inner cylinder fixed to another of the motor and the sprung structure, and
    the first elastic member that is interposed between the outer cylinder and the inner cylinder.

10. The suspension device according to claim 9, wherein an axial direction of the outer cylinder and the inner cylinder is a direction intersecting the first direction.

11. The suspension device according to claim 7, wherein the torsion bar is not supported on the sprung structure between the first portion and the second portion.

12. The suspension device according to claim 7, further comprising a bar support member that is configured to support the torsion bar on the sprung structure via a second elastic member.

* * * * *